United States Patent
Makigawa et al.

(10) Patent No.: US 9,559,579 B2
(45) Date of Patent: Jan. 31, 2017

(54) CIRCUIT AND POWER SUPPLY CIRCUIT WITH OUTPUT THAT TRANSITIONS BETWEEN CAPACITOR STORED VOLTAGE AND PREDETERMINED VOLTAGE

(71) Applicant: Sony Corporation, Tokyo (JP)

(72) Inventors: Kiyoshi Makigawa, Kanagawa (JP); Moonjae Jeong, Kanagawa (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 14/301,105

(22) Filed: Jun. 10, 2014

(65) Prior Publication Data

US 2015/0002123 A1 Jan. 1, 2015

(30) Foreign Application Priority Data

Jun. 28, 2013 (JP) .................................. 2013-135779

(51) Int. Cl.
*G05F 1/46* (2006.01)
*H02M 1/36* (2007.01)

(52) U.S. Cl.
CPC . *H02M 1/36* (2013.01); *G05F 1/46* (2013.01)

(58) Field of Classification Search
CPC .......... H02M 1/08; H02M 1/088; H02M 1/36; G05F 1/10; G05F 1/46; G05F 1/461; G05F 1/468; G05F 1/56; G05F 1/561; G05F 1/575

See application file for complete search history.

(56) References Cited

U.S. PATENT DOCUMENTS

| 5,870,000 A * | 2/1999 | Matsuda .............. H03K 3/0231 331/111 |
| 6,348,833 B1 | 2/2002 | Tsujimoto et al. |
| 7,193,453 B2 * | 3/2007 | Wei ...................... H03K 17/165 327/112 |
| 2006/0119422 A1 * | 6/2006 | Sakurai ................... G05F 3/262 327/543 |
| 2006/0271342 A1 * | 11/2006 | Farhat .................. G06N 3/0635 703/2 |
| 2013/0106385 A1 * | 5/2013 | Smith, Jr. ........... H02M 3/1588 323/288 |

OTHER PUBLICATIONS

Chun-Yu Hsieh, et al.,"A Novel Precise Step-Shaped Soft-Start Technique for Integrated DC-DC Converter", 14th IEEE International Conference on Electronics, Circuits and Systems, pp. 771-774, 2007.
Ke-Horng Chen, et al.,"Bidirectional Current-Mode Capacitor Multipliers for On-Chip Compensation", IEEE Transactions on Power Electronics, vol. 23, 2008, pp. 180-188, 2007.

* cited by examiner

*Primary Examiner* — Matthew Nguyen
(74) *Attorney, Agent, or Firm* — Michael Best & Friedrich LLP

(57) ABSTRACT

There is provided a circuit including a capacitor, a current source configured to supply a current to the capacitor, a comparator configured to output a result of comparison between a voltage stored in the capacitor and a predetermined voltage, and a switch section configured to intermittently which is caused to flow to the capacitor by the current source.

11 Claims, 10 Drawing Sheets

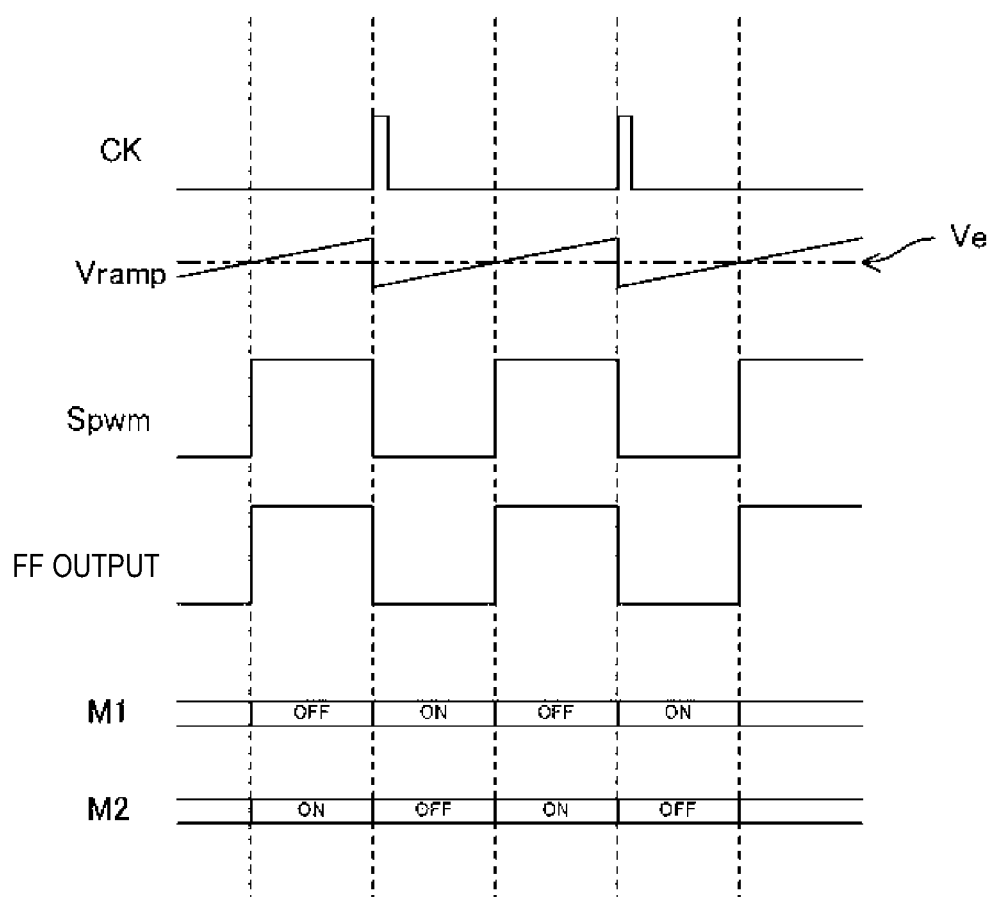

CIRCUIT AND POWER SUPPLY CIRCUIT WITH OUTPUT THAT TRANSITIONS BETWEEN CAPACITOR STORED VOLTAGE AND PREDETERMINED VOLTAGE

CROSS REFERENCE TO RELATED APPLICATIONS

This application claims the benefit of Japanese Priority Patent Application JP 2013-135779 filed Jun. 28, 2013, the entire contents of which are incorporated herein by reference.

BACKGROUND

The present technology relates to a circuit, particularly, to a circuit that generates timing by utilizing charging and discharging to and from a capacitor using a current source.

Various types of soft start-up circuits according to the related art are known (see, for example, Hirokazu Tsujimoto and Tetsuo Tateishi, "SOFT STARTING REFERENCE VOLTAGE CIRCUIT", U.S. Pat. No. 6,348,833, Kabushiki Kaisya Toyoda Jidoshokki Seisakusyo, 2002 (Patent Literature 1), Chun-Yu Hsieh, Yung-Chun Chuang, and Ke-Horng Chen, "A Novel Precise Step-Shaped Soft-Start Technique for Integrated DC-DC Converter", 14th IEEE International Conference on Electronics, Circuits and Systems, pp 771-774, 2007 (Non-Patent Literature 1), and Ke-Horng Chen, Chia-Jung Chang and Te-Hsien Liu, "Bidirectional Current-Mode Capacitor Multipliers for On-Chip Compensation", IEEE Transactions on Power Electronics, Vol. 23, 2008, pp 180-188 (Non-Patent Literature 2)). FIG. 15 is a diagram illustrating an example power supply circuit including a soft start-up circuit, and FIG. 16 is a timing chart for explaining the operation of the power supply circuit illustrated in FIG. 15. The power supply circuit 1 illustrated in FIG. 15 is a step-down DC-DC converter in voltage control mode, and includes a DC power supply voltage B, switching elements M1, M2, an inductor L, an output capacitor C, a feedback control circuit FB, and a soft start-up circuit SS.

One end of the inductor L is connected to the positive terminal of the power supply voltage B via the switching element M1 as well as to the ground via the switching element M2. The other end of the inductor L is connected to a load as well as to the ground via the output capacitor C.

The switching element M1 is a P-channel electric field effect transistor (hereinafter referred to as a PFET), and when the switching element M1 is switched from off to on, magnetic energy is stored in the inductor L, and a current, which is smoothed by the inductor L and the capacitor C, is supplied to the load.

The switching element M2 is an N-channel electric field effect transistor (hereinafter referred to as a NFET), and when the switching element M2 is switched from off to on, the magnetic energy stored in the inductor L flows as a current through the load via the switching element M2 and is discharged, the current being smoothed by the inductor L and the capacitor C. It should be noted that the switching element M2 may be configured with a commutation diode.

The switching elements M1, M2 receive inputs of PWM control signals at their control terminals from the driver circuit Drv described later, the PWM control signals having on/off states inverted to each other. That is, when the switching element M1 is on, the switching element M2 is off, and when the switching element M1 is off, the switching element M2 is on. In this manner, constant voltage control can be performed according to a duty ratio of the PWM control signals.

The feedback control circuit FB includes an error amplifier EA, a comparator Comp, a flip-flop FF, and the driver circuit Drv, and is configured to control on/off of the switching elements M1, M2 so that an output voltage V0 converges to a target voltage.

The error amplifier EA detects an error between the output voltage and the target voltage, and outputs an error voltage Ve. Specifically, the error amplifier EA receives inputs of a voltage bV0 and a reference voltage Vref, and outputs a voltage as the error voltage Ve according to the difference between the voltage bV0 and the reference voltage Vref, the voltage bV0 being obtained by dividing the output voltage V0 of the power supply circuit 1 into a predetermined ratio, the reference voltage Vref indicating the target voltage of the voltage Vb0.

The comparator Comp generates a switching signal to be outputted to the driver circuit Drv. Specifically, the comparator Comp receives inputs of the error voltage Ve and a ramp wave Vramp which is a saw-tooth triangular wave inputted from a triangular wave generation circuit, and outputs a signal of positive logic (high level) when the error voltage Ve is higher than the lamp signal Vramp, or outputs a signal of negative logic (low level) when the error voltage Ve is lower than or equal to the ramp signal Vramp. That is, a PWM signal Spwm having a frequency according to the period of the ramp wave Vramp is outputted.

The flip-flop FF receives inputs of the PWM signal Spwm and a clock signal CK at reset terminal R and set terminal S, respectively, and outputs a PWM signal equivalent to the PWM signal Spwm to the driver circuit Dry only when the clock signal CK is being inputted.

When positive logic (high level) is inputted, the driver circuit Dry turns on the switching element M1 and turns off the switching element M2, whereas when negative logic (low level) is inputted, the driver circuit Dry turns off the switching element M1 and turns on the switching element M2.

Thus, the on/off ratio of the switching element M1 and the switching element M2 is controlled as follows: when the output voltage V0 is lower than the target voltage, the on-proportion of the switching element M1 and the off-proportion of the switching element M2 are increased, whereas when the output voltage V0 is higher than the target voltage, the off-proportion of the switching element M1 and the on-proportion of the switching element M2 are increased. As a consequence, on/off of the switching elements M1, M2 is controlled so that the output voltage V0 converges to the target voltage.

In the case where a desired reference voltage Vref is directly inputted to the error amplifier without providing the soft start-up circuit SS, when the power supply is activated, a rush current flows due to an abrupt rise of the output voltage. The rush current that occurs at the time of activation of the power supply is caused by a current that is for supplying charging current to the output capacitor Specifically, when voltage bV0 corresponding to the output voltage V0 and the reference voltage Vref are inputted to the error amplifier at the time of activation of the power supply 1, the error voltage Ve outputted by the error amplifier EA is increased to nearly power supply voltage Vg.

At this point, the output of the comparator Comp is in a low level state, and thus the switching element M1 is turned on, and this state continues until all capacitors connected to the power source line are charged to a set voltage.

An increasing amount of current is continued to be supplied from a power supply circuit and/or a battery in a previous stage that supply power to the power supply circuit 1, which eventually causes an over current state, and a problem such as breakdown of a power transistor (such as the transistor elements M1, M2) and/or the inductor L may occur.

The capacitance of the output capacitor is decreasing every year due to an increase in switching frequency, and so effect of large capacitance is decreasing. However, many power supply circuits still need large-capacitance output capacitors, and in some cases, not only output capacitors but also huge capacitors are installed in a power line as a measure against momentary power failure. Therefore, at the time of activation of such a power supply circuit, it is necessary to charge all capacitors connected to the power line from 0V to the set voltage.

In order to avoid such a problem, it is preferable to reduce the charging current to the output capacitors. To cope with this, the power supply circuit 1 including a DC-DC converter is provided with a soft start-up circuit SS (see, for example, Patent Literature 1 and Non-Patent Literature 1, 2) that controls charging current to a capacitor to be lower than a certain level by delaying the increasing rate of the output voltage, thereby reducing rush current and/or overshoot which occurs due to an input at the time of activation of the power supply circuit 1.

SUMMARY

The soft start-up circuits described in Patent Literature 1 and Non-Patent Literature 1, 2 have slightly different circuit configurations but have the same operational principle, and cause the reference voltage to be gradually increased by flowing a constant current to a large-capacitance capacitor from the current source. The soft start-up time is the time taken for the reference voltage to increase up to a predetermined reference voltage Vref.

In order to prevent breakdown of a power transistor and/or an inductor due to a rush current at the time of activation, it is preferable to provide a soft start-up time which is longer than a certain time interval. In order to increase the soft start-up time, it is preferable to decrease the current value of a constant current source that supplies a constant current to the capacitor or to increase the capacitance of the capacitor. However, the current value of the constant current source has a technical minimum, and so in some cases, there is no alternative but to increase the capacitance of the capacitor and the capacitor is often externally attached.

The present technology has been devised in view of the above-described problems, and it is desirable to be able to reduce the capacitance of a capacitor in a circuit like the aforementioned start-up circuit, in which the voltage of the capacitor is gradually changed by the current which is supplied from a constant current source.

The circuit according to an embodiment of the present technology includes a capacitor, a current source configured to supply a current to the capacitor, a comparator configured to output a result of comparison between a voltage stored in the capacitor and a predetermined voltage, and a switch section configured to intermittently allow flowing and blocking of a current which is caused to flow to the capacitor by the current source.

The present technology has various embodiments in which the circuit according to an embodiment of the present technology is implemented with being incorporated in another device or implemented with another method.

With the present technology, the capacitance of a capacitor can be reduced in a circuit in which the voltage of the capacitor is gradually changed by the current which is supplied by a constant current source. It should be noted that the effects described in the present description are for illustration only and are not meant to be limiting on the present technology which may have additional effects.

BRIEF DESCRIPTION OF THE DRAWINGS

FIG. 16 is a timing chart for explaining an operation of a power supply circuit including a soft start-up circuit according to the related art.

DETAILED DESCRIPTION OF THE EMBODIMENTS

Figure 1:
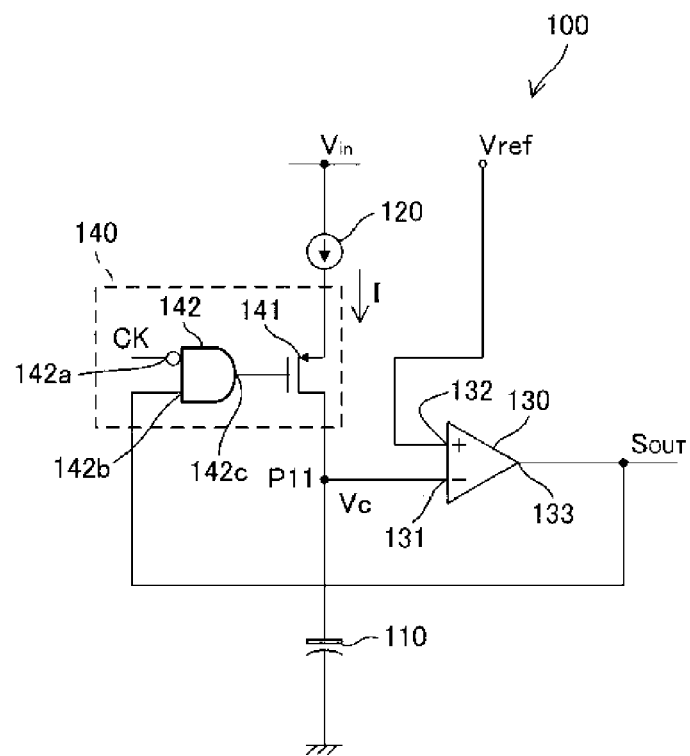
FIG. 1 is a diagram illustrating a configuration of a circuit according to a first embodiment.

Hereinafter, each of the embodiments of the present technology will be described with reference to the accompanying drawings.
(1) First Embodiment
FIG. 1 is a diagram illustrating a configuration of a circuit according to a first embodiment. In a circuit 100 illustrated in FIG. 1, a capacitor 110 is gradually charged by current I which is supplied from a constant current source 120, and when stored voltage Vc of the capacitor 110 exceeds a reference voltage Vref after an elapse of a predetermined time since the start of the circuit operation, the output of a comparator 130 is inverted.

The current is supplied to the capacitor 110 from the constant current source 120 via a switch section 140, and the predetermined time, which is taken until the stored voltage Vc of the capacitor 110 exceeds the reference voltage Vref and the output of the comparator 130 is inverted, can be suitably controlled by on-proportion of the switch section 140 which is turned on and off intermittently. Hereinafter, the circuit 100 will be described in detail.

The capacitor 110 and the constant current source 120 are disposed on a line that connects between the line of the constant voltage Vin and the ground. In addition, on the line, the switch section 140 is disposed between the constant current source 120 and the capacitor 110 which are connected via the switch section 140.

The switch section 140 includes a switching transistor 141 (PMOS in FIG. 1) and an AND circuit 142. It should be noted that one input section 142*a* of the AND circuit 142 functions as an inverting input.

The switching transistor 141 is disposed between the constant current source 120 and the capacitor 110 on the line on which the capacitor 110 and the constant current source 120 are disposed. That is, the constant current source 120 and the capacitor 110 are connected via the switching transistor 141.

The control terminal (the gate terminal in FIG. 1) of the switching transistor 141 is connected to an output section 142*c* of the AND circuit 142, thereby allowing on/off of the switching transistor 141 to be controlled by a control signal which is outputted by the AND circuit 142.

The one input section 142*a* of the AND circuit 142 receives a clock signal CK, and the other input section 142*b* of the AND circuit 142 receives an output of the comparator 130. The clock signal CK is a signal that is intermittently inverted between a high level (positive logic) and a low level (negative logic). The clock frequency of the clock signal CK is controlled by the control of a control unit (adjustment unit) provided externally of the circuit 100. It should be noted that "intermittently" may refer to periodically or non-periodically.

Figure 2:
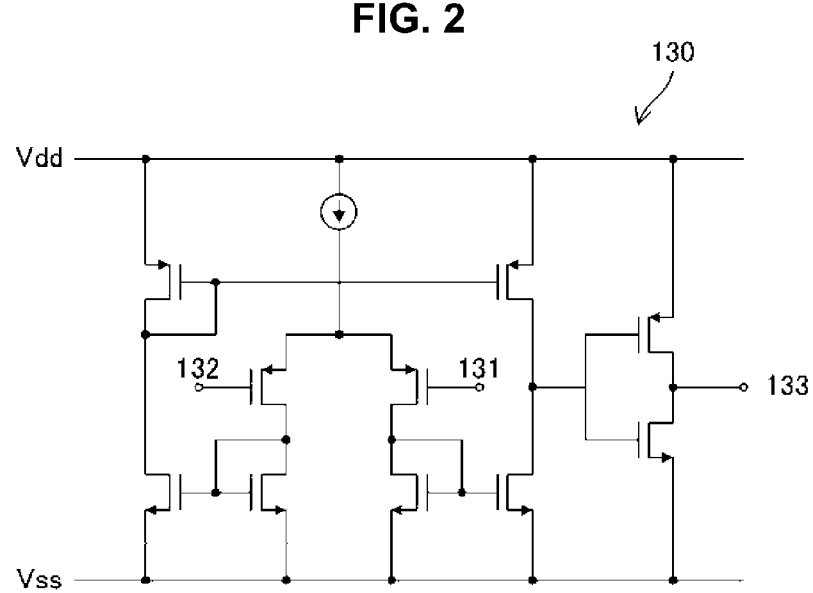
FIG. 2 is a diagram illustrating an example internal configuration of a comparator.

FIG. 2 is a diagram illustrating an example internal configuration of the comparator 130. While the input to an input section 131 does not exceed the input to an input section 132, that is, until the predetermined time elapses since the start of the circuit operation of the circuit 100, the comparator 130 outputs a positive logic from the output section 133, whereas after the input to the input section 131 exceeds the input to the input section 132, that is, after the predetermined time elapses since the start of the circuit operation of the circuit 100, the comparator 130 outputs a negative logic from the output section 133.

After the circuit operation of the circuit 100 is started and input of the clock signal CK to the AND circuit 142 is started, the AND circuit 142 outputs an intermittently inverted on/off signal similar to the clock signal CK while the output of the comparator 130 is on (positive logic), and outputs off (negative logic) constantly irrespective of the on/off of the clock signal CK when the output of the comparator 130 is off (negative logic). It should be noted that the AND circuit 142 outputs nothing before the circuit operation of the circuit 100 is started because the clock signal CK is not inputted to the AND circuit 142.

That is, although the switching transistor 141 is off due to an input of positive logic to its control terminal before the start of the circuit operation of the circuit 100, when the circuit operation of the circuit 100 is started, the switching transistor 141 is intermittently turned on and off in accordance with the on/off of the clock signal CK. Subsequently, after an elapse of the predetermined time, the switching transistor 141 is constantly on because positive logic is constantly inputted to the control terminal. Thus, the capacitor 110 is continued to be charged even after an elapse of the predetermined time, and as a consequence, the capacitor 110 is charged up to the constant voltage Vin (>Vref) level, and thereby malfunction of detection can be prevented after the comparator 130 detects that [stored voltage Vc]>[reference voltage Vref].

When the switching transistor 141 is on, the stored voltage Vc of the capacitor 110 is gradually increased by the current which is generated by the constant current source 120, and when the switching transistor 141 is off, the stored voltage Vc of the capacitor 110 is not changed. Because the switching transistor 141 is turned on and off intermittently, once the circuit operation of the circuit 100 is started, a constant current is intermittently supplied from the constant current source 120 to the capacitor 110 until the predetermined time elapses.

Thus, in contrast to the case where the switch section 140 is not provided or the case where the switch section 140 is turned on continuously, the rate of change in the amount of charge can be reduced, the charge being stored in the capacitor 110 by the current which is supplied by the constant current source 120.

In other words, in contrast to the case where the switch section 140 is not provided or the case where the switch section 140 is turned on continuously, the time taken for the stored voltage Vc of the capacitor 110 to reach a target voltage can be increased. In addition, with suitable adjustment of the on-proportion in intermittent on/off, it is also possible suitably adjust the time that is taken for the stored voltage Vc of the capacitor 110 to reach a target voltage.

The one input section 131 of the comparator 130 receives an input of the stored voltage Vc of the capacitor 110 that is gradually charged in this manner, and the other input section 132 of the comparator 130 receives an input of the reference voltage Vref.

The reference voltage Vref is a target voltage of the stored voltage Vc, and when the stored voltage Vc reaches the reference voltage Vref (when the magnitude relationship between the stored voltage Vc and the reference voltage Vref is reversed), the comparator 130 changes a signal Sout to be outputted from the output section 133. That is, it is possible to detect that the stored voltage Vc reaches the reference voltage Vref (target voltage) by monitoring the output signal Sout.

Also, the circuit 100 can be used as a timer circuit when the current value of the constant current source 120, the capacitance of the capacitor 110, and the on-proportion of the switch section 140 are already known because it takes a fixed time for the stored voltage Vc to reach the reference voltage Vref since the start of the operation of the circuit 100.

Here, it is defined that T1 is the time taken for the stored voltage Vc of the capacitor 110 to reach the reference voltage Vref (target voltage), T11 is the time T1 in the case where the switch section 140 is turned on continuously, and T12 is the time T1 in the case where the switch section 140 is turned on intermittently, then T11<T12 under the same condition on the current value of the constant current source 120 and the capacitance of the capacitor 110.

That is, the time T12 can be increased longer than the time T11 without decreasing the current value of the constant current source 120 by turning on and off the switch section 140 intermittently. In addition, with suitable adjustment of the on-proportion in intermittent on/off, the time T12 can be controlled to be a desired value by increasing the time T12 longer than the time T11.

In addition, in contrast to the case where the switch section 140 is not provided or the case where the switch section 140 is turned on continuously, the capacitance of the capacitor 110 can be reduced and/or the current value of the constant current source 120 can be increased. Consequently, the circuit area can be reduced and flexibility and simplicity in design can be improved.

(2) Second Embodiment

Figure 3:
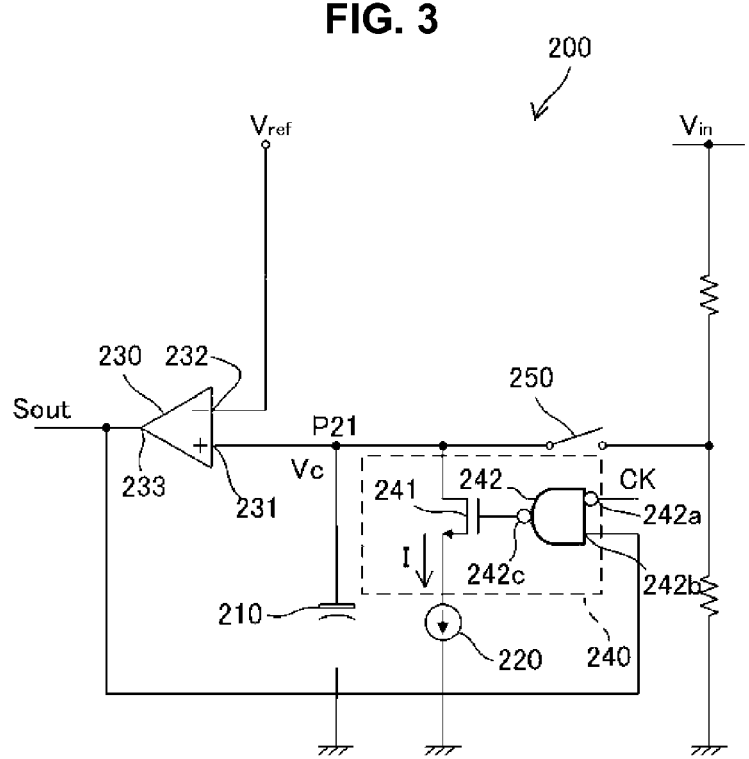
FIG. 3 is a diagram illustrating a configuration of a circuit according to a second embodiment.

FIG. 3 is a diagram illustrating a configuration of a circuit according to a second embodiment. In a circuit 200 illustrated in FIG. 3, a capacitor 210 is gradually discharged by current I which is supplied from a constant current source 220, and when the stored voltage Vc of the capacitor 210 falls below the reference voltage Vref after an elapse of a predetermined time, the output of a comparator 230 is inverted.

The current is supplied to the capacitor 210 from the constant current source 220 via a switch section 240, and the predetermined time, which is taken until the stored voltage Vc of the capacitor 210 falls below the reference voltage Vref and the output of the comparator 230 is inverted, can be suitably controlled by the on-proportion of the switch section 240 which is turned on and off intermittently.

The circuit 200 also includes a switch section 250 that switches on and off of connection between the capacitor 210 and the constant voltage source Vin, and the capacitor 210 can be charged appropriately from the constant voltage source Vin by turning on the switch section 250. When the switch section 250 is turned off, the circuit operation of the circuit 200 is started. On/off of the switch section 250 is controlled by a control signal from a control unit provided externally of the circuit 200. Hereinafter, the circuit 200 will be described in detail.

The capacitor 210 and the constant current source 220 are each disposed on a corresponding one of lines that are provided in parallel between point P21 and the ground. The switch section 240 is disposed between the constant current source 220 and the point P21 on the line on which the constant current source 220 is disposed. That is, the capacitor 210 is connected to the constant current source 220 via the switch section 240.

The switch section 240 includes a switching transistor 241 (NMOS in FIG. 3) and an NAND circuit 242. It should be noted that one input section 242a of the AND circuit 242 functions as an inverting input.

The switching transistor 241 is disposed between the point P21 and the constant current source 220 on the line on which the constant current source 220 is disposed. That is, the constant current source 220 and the capacitor 210 are connected via the switching transistor 241.

The control terminal (the gate terminal in FIG. 3) of the switching transistor 241 is connected to an output section 242c of the NAND circuit 242, thereby allowing on/off of the switching transistor 241 to be controlled by a control signal which is outputted by the NAND circuit 242.

One input section 242a of the NAND circuit 242 receives a clock signal CK, and the other input section 242b of the NAND circuit 242 receives an output of the comparator 230. The clock signal CK is a signal that is intermittently inverted between a high level (positive logic) and a low level (negative logic). The clock frequency of the clock signal CK is controlled by the control of a control unit (adjustment unit) provided externally of the circuit 200. It should be noted that "intermittently" may refer to periodically or non-periodically.

The comparator 230 has substantially the same circuit configuration as FIG. 2 described above, for example. While the input to an input section 231 does not falls below the input to an input section 232, that is, until a predetermined time elapses since the start of the circuit operation of the circuit 200, the comparator 230 outputs a positive logic from an output section 233, whereas after the input to the input section 231 falls below the input to the input section 232, that is, after the predetermined time elapses since the start of the circuit operation of the circuit 200, the comparator 230 outputs a negative logic from the output section 233.

After the circuit operation of the circuit 200 is started and input of the clock signal CK to the NAND circuit 242 is started, the NAND circuit 242 outputs an intermittently inverted on/off signal similar to the clock signal CK while the output of the comparator 230 is on (positive logic), and outputs on (positive logic) constantly irrespective of the on/off of the clock signal CK when the output of the comparator 230 is off (negative logic).

That is, the switching transistor 241 is intermittently turned on and off in accordance with the on/off of the clock signal CK until the predetermined time elapses since the start of the circuit operation of the circuit 200, and subsequently, after an elapse of the predetermined time, negative logic is inputted to the control terminal and the switching transistor 141 is turned off. Thus, the capacitor 210 is continued to be discharged even after an elapse of the predetermined time, and as a consequence, the capacitor 210 is discharged down to the ground level (<Vref), and thereby malfunction of detection can be prevented after the comparator 230 detects that [stored voltage Vc]<[reference voltage Vref].

When the switching transistor 241 is on, the stored voltage Vc of the capacitor 210 is gradually decreased by the current which is generated by the constant current source 220, and when the switching transistor 241 is off, the stored voltage Vc of the capacitor 210 is not changed. Because the switching transistor 241 is turned on and off intermittently, once the circuit operation of the circuit 200 is started, a constant current is intermittently supplied from the constant current source 220 to the capacitor 210 until the predetermined time elapses.

Thus, in contrast to the case where the switch section 240 is not provided or the case where the switch section 240 is turned on continuously, the rate of change in the amount of charge can be reduced, the charge being stored in the capacitor 210 by the current which is supplied by the constant current source 220.

In other words, in contrast to the case where the switch section 240 is not provided or the case where the switch section 240 is turned on continuously, the time taken for the voltage of the capacitor 210 to reach a target voltage can be increased. In addition, with suitable adjustment of the on-proportion in intermittent on/off, it is also possible suitably adjust the time that is taken for the voltage of the capacitor 210 to reach a target voltage.

The one input section 231 of the comparator 230 receives an input of the stored voltage Vc of the capacitor 210 that is gradually discharged in this manner, and the other input section 232 of the comparator 230 receives an input of the reference voltage Vref.

The reference voltage Vref is a target voltage of the stored voltage Vc, and when the stored voltage Vc reaches the reference voltage Vref (when the magnitude relationship between the stored voltage Vc and the reference voltage Vref is reversed), the comparator 230 changes the signal Sout from positive logic to negative logic, the signal Sout being to be outputted from the output section 233. That is, it is possible to detect that the stored voltage Vc reaches the reference voltage Vref (target voltage) by monitoring the output signal Sout.

Also, the circuit 200 can be used as a timer circuit when the current value of the constant current source 220, the capacitance of the capacitor 210, and the on-proportion of the switch section 240 are already known because it takes a fixed time for the stored voltage Vc to reach the reference voltage Vref since the start of the operation of the circuit 200.

Here, it is defined that T2 is the time taken for the stored voltage Vc of the capacitor 210 to reach the reference voltage Vref (target voltage), T21 is the time T2 in the case where the switch section 240 is turned on continuously, and T22 is the time T2 in the case where the switch section 240 is turned on intermittently, then T21<T22 under the same condition on the current value of the constant current source 220 and the capacitance of the capacitor 210.

That is, the time T22 can be increased longer than the time T21 without decreasing the current value of the constant current source 220 by turning on and off the switch section 240 intermittently. In addition, with suitable adjustment of the on-proportion in intermittent on/off, the time T22 can be controlled to be a desired value by increasing the time T22 longer than the time T21.

In addition, in contrast to the case where the switch section 240 is not provided or the case where the switch section 240 is turned on continuously, the capacitance of the capacitor 210 can be reduced and/or the current value of the constant current source 220 can be increased. Consequently, the circuit area can be reduced and flexibility and simplicity in design can be improved.

(3) Third Embodiment

Figure 4:
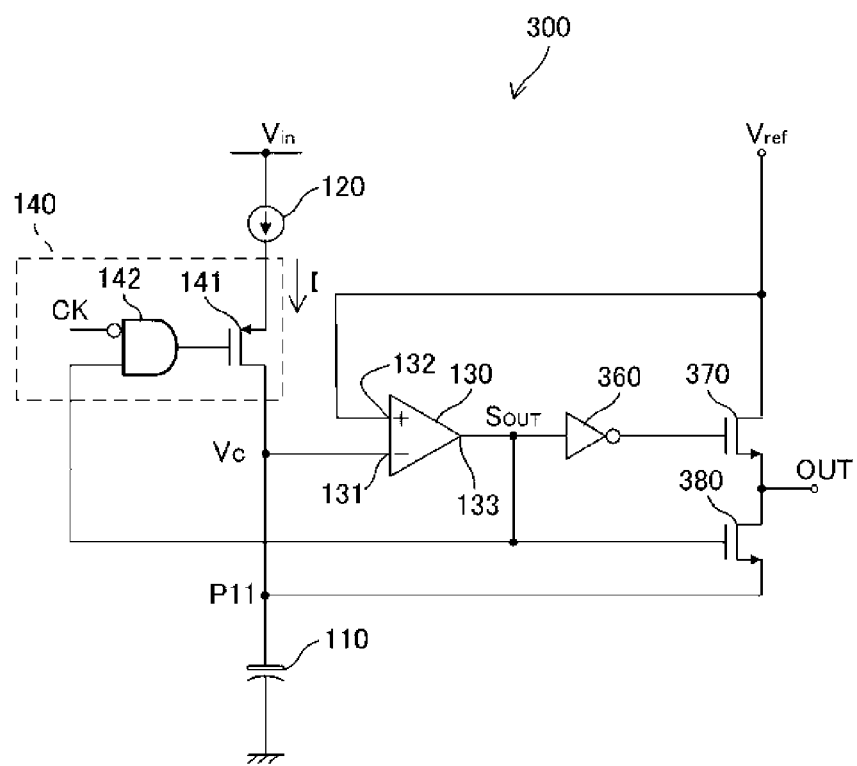
FIG. 4 is a diagram illustrating a configuration of a circuit according to a third embodiment.
Figure 5:
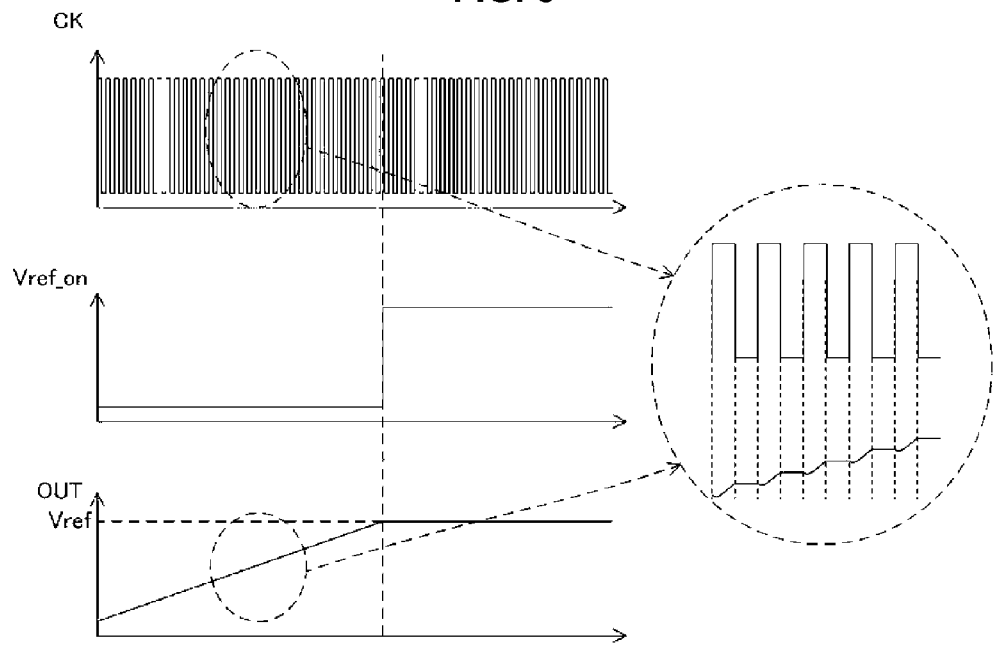
FIG. 5 is a timing chart for explaining an operation of the circuit according to the third embodiment.

FIG. 4 is a diagram illustrating a configuration of a circuit according to a third embodiment, and FIG. 5 is a timing chart for explaining an operation of the circuit according to the third embodiment. The configuration of a circuit 300 illustrated in FIG. 4 partially includes the configuration of the circuit 100 according to the first embodiment, and thus the components in common with the circuit 100 are denoted by the same symbols and a detailed description will be omitted.

In the circuit 300 illustrated in FIG. 4, the capacitor 110 is gradually charged by the current I which is supplied from the constant current source 120, and when a predetermined time has elapsed since the start of the circuit operation, the output voltage reaches a target voltage. The circuit 300 continues to output the stored voltage Vc, which is gradually increased to a target voltage, until the output voltage reaches a target voltage, and after the stored voltage Vc reaches the target voltage, the circuit 300 outputs a reference voltage Vref as a constant voltage.

The configuration of the circuit 300 differs from that of the circuit 100 in that the circuit 300 includes an inverter 360 and switching elements 370, 380 (NMOS in FIG. 4) as first and second switching elements.

The switching elements 370, 380 are connected in series between the line of the reference voltage Vref and point P11. The switching elements 370, 380 are configured to be turned on or off at opposite timing and the voltage at a connection point between the switching elements 370, 380 represents the output voltage OUT of the circuit 300.

In the example illustrated in FIG. 4, the control terminal (a gate terminal in FIG. 4) of the switching element 370 is connected to the output section 133 of the comparator unit 130 via the inverter 360, whereas the control terminal (a gate terminal in FIG. 4) of the switching element 380 is connected to the output section 133 of the comparator 130 not via the inverter.

Therefore, when the switching element 380 is on and the switching element 370 is off, the circuit 300 outputs the voltage of the capacitor 110 as the output voltage OUT, and when the switching element 370 is on and the switching element 380 is off, the circuit 300 outputs the reference voltage Vref as the output voltage OUT.

In the circuit 300 configured in this manner, in contrast to the case where the switch section 340 is not provided or the case where the switch section 340 is turned on continuously, the time taken for the voltage outputted by the circuit 300 to reach the reference voltage Vref since the start of the circuit operation of the circuit 300 can be increased.

When the output of the circuit 300 reaches the reference voltage Vref, the output of the comparator 130 is changed to negative logic, and thus the switching element 380 is turned off, whereas the output of the inverter 360 (Vref_on illustrated in FIG. 5) is changed to positive logic and thus the switching element 370 is turned on.

Consequently, as illustrated in FIG. 5, the output voltage OUT of the circuit 300 is switched from the stored voltage Vc of the capacitor 110 to a constant voltage, the reference voltage Vref after a predetermined elapsed time. Therefore, after a predetermined time has elapsed, the reference voltage Vref can be outputted in a stable manner.

(4) Fourth Embodiment

Figure 6:
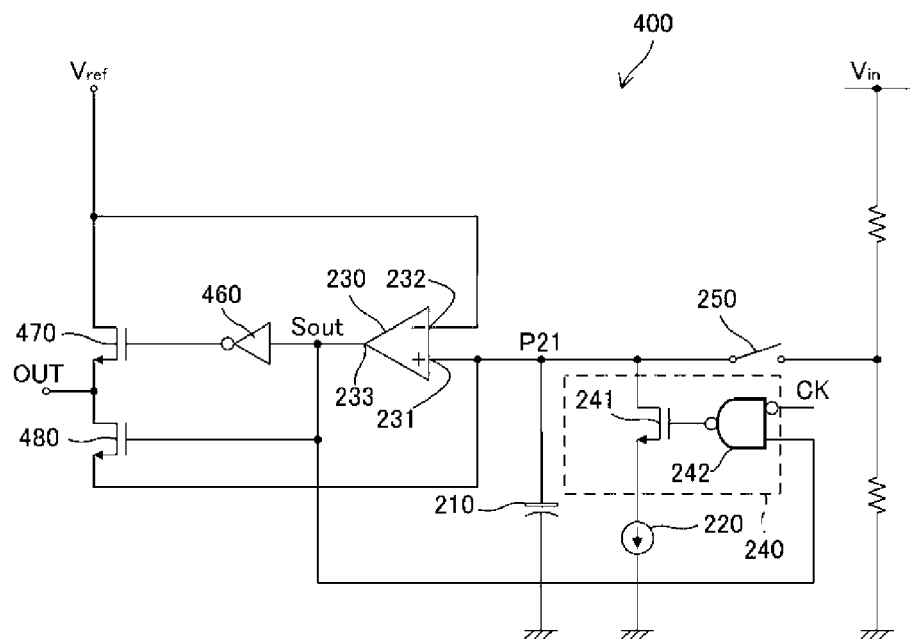
FIG. 6 is a diagram illustrating a configuration of a circuit according to a fourth embodiment.
Figure 7:
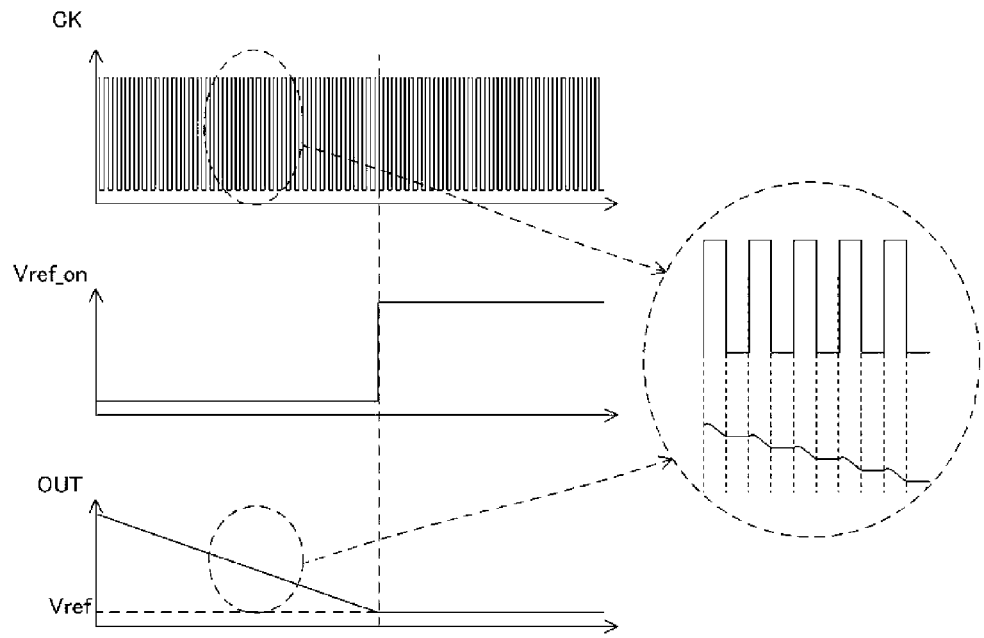
FIG. 7 is a timing chart for explaining an operation of the circuit according to the fourth embodiment.

FIG. 6 is a diagram illustrating a configuration of a circuit according to a fourth embodiment. FIG. 7 is a timing chart for explaining an operation of the circuit according to the fourth embodiment. The configuration of a circuit 400 illustrated in FIG. 6 partially includes the configuration of the circuit 200 according to the second embodiment, and thus the components in common with the circuit 200 are denoted by the same symbols and a detailed description will be omitted.

In the circuit 400 illustrated in FIG. 6, when a predetermined time has elapsed since the start of the circuit operation, the output voltage reaches a target voltage. The circuit 400 continues to output a voltage, which is gradually decreased to a target voltage, until the output reaches the target voltage, and after the output reaches the target voltage, the circuit 400 outputs the target voltage as a constant voltage.

The configuration of the circuit 400 differs from that of the circuit 200 in that the circuit 400 includes an inverter 460 and switching elements 470, 480 (NMOS in FIG. 6) as the first and second switching elements.

The switching elements 470, 480 are connected in series between the line of the reference voltage Vref and point P21. The switching elements 470, 480 are configured to be turned on or off at opposite timing and the voltage at a connection point between the switching elements 470, 480 represents the output voltage OUT of the circuit 400.

In the example illustrated in FIG. 6, the control terminal (a gate terminal in FIG. 6) of the switching element 470 is connected to the output section 233 of the comparator unit 230 via the inverter 460, whereas the control terminal (a gate terminal in FIG. 6) of the switching element 480 is connected to the output section 233 of the comparator 230 not via the inverter 460.

Therefore, when the switching element 480 is on and the switching element 470 is off, the circuit 400 outputs the voltage of the capacitor 210 as the output voltage OUT, and when the switching element 470 is on and the switching element 480 is off, the circuit 400 outputs the reference voltage Vref as the output voltage OUT.

In this manner, in contrast to the case where the switch section 240 is not provided or the case where the switch section 240 is turned on continuously, the time taken for the voltage outputted by the circuit 400 to reach the reference voltage Vref since the start of the circuit operation of the circuit 400 can be increased.

When the output of the circuit 400 reaches the reference voltage Vref, the output of the comparator 230 is changed to negative logic, and thus the switching element 480 is turned off, whereas the output of the inverter 460 (Vref_on illustrated in FIG. 7) is changed to positive logic and thus the switching element 470 is turned on.

Consequently, as illustrated in FIG. 7, the output voltage OUT of the circuit 400 is switched from the stored voltage Vc of the capacitor 210 to a constant voltage, the reference voltage Vref after a predetermined elapsed time. Therefore, after a predetermined time has elapsed, the reference voltage Vref can be outputted in a stable manner.

(5) Fifth Embodiment

Figure 8:
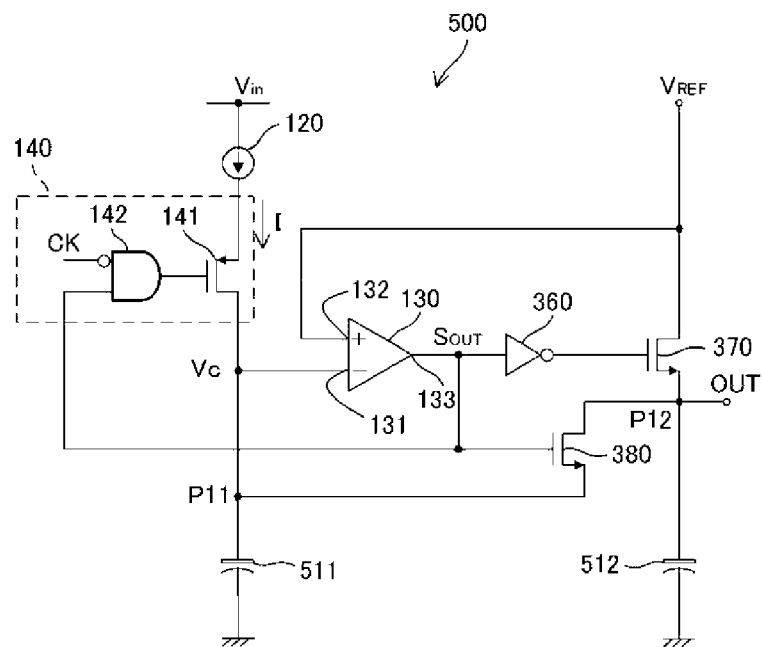
FIG. 8 is a diagram illustrating a configuration of a circuit according to a fifth embodiment.

FIG. 8 is a diagram illustrating a configuration of a circuit according to a fifth embodiment. A circuit 500 illustrated in FIG. 8 includes components mostly in common with the circuit 300 according to the third embodiment, and thus the components in common with the circuit 300 are denoted by the same symbols and a detailed description will be omitted. The circuit 500 illustrated in FIG. 8 differs from the circuit 300 in that instead of the capacitor 110, the circuit 500 includes capacitors 511, 512 as first and second capacitors.

Similarly to the capacitor 110, the capacitor 511 connects between the point P11 and the ground. On the other hand, the capacitor 512 is connected between a connection point P12 of the switching elements 370, 380 and the ground.

While the switching element 380 is on and the switching element 370 is off, the connection point P12 is connected to the point P11 via the switching element 380, and thus the capacitors 511, 512 are connected in parallel between the point P11 and the ground. That is, the capacitors 511, 512 connect between the point P11 and the ground as combined capacitance.

On the other hand, while the switching element 370 is on and the switching element 380 is off, the capacitor 512 connects between the connection point P12 and the ground as a single element. That is, only the capacitor 511 connects between the point P11 and the ground. In this state, the capacitor 511 also functions as a bypass capacitor for the line of the reference voltage Vref.

By dividing the total capacitance in this manner, the capacitance of the capacitor 511 can be reduced, and with the additional capacitor 512 to the capacitor 511, the capacitance to be charged at the time of start-up can be increased compared with the case where the capacitor 511 is provided as a single element. Thereby, the start-up time can be increased without changing the capacitance of the capacitor 511 and/or the capacitance of the capacitor 511 can be reduced without changing the start-up time.

(6) Sixth Embodiment

Figure 9:
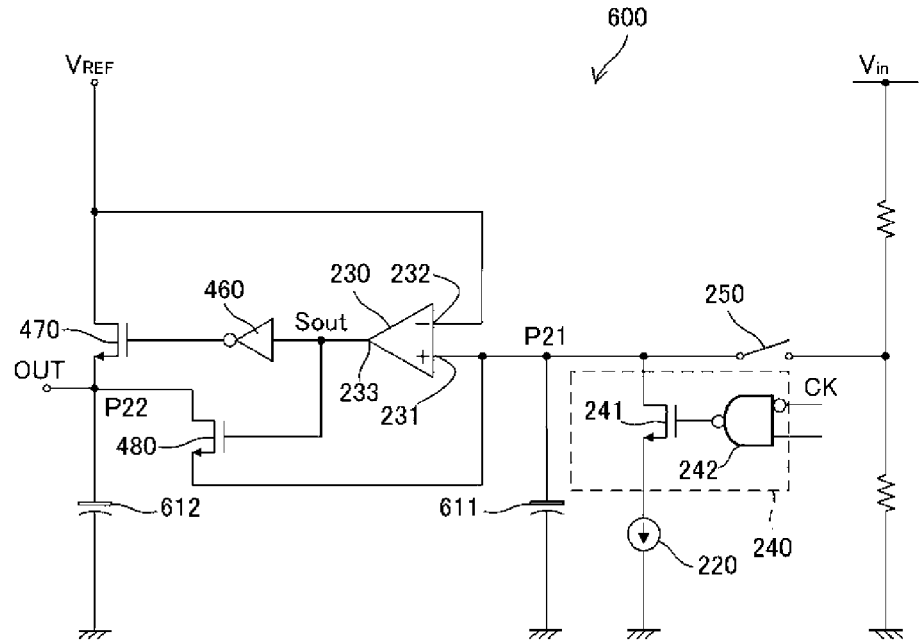
FIG. 9 is a diagram illustrating a configuration of a circuit according to a sixth embodiment.

FIG. 9 is a diagram illustrating a configuration of a circuit according to a sixth embodiment. A circuit 600 illustrated in FIG. 9 includes components mostly in common with the circuit 400 according to the fourth embodiment, and thus the components in common with the circuit 400 are denoted by the same symbols and a detailed description will be omitted. The circuit 600 illustrated in FIG. 9 differs from the circuit 400 in that instead of the capacitor 210, the circuit 600 includes capacitors 611, 612 as first and second capacitors.

Similarly to the capacitor 210, the capacitor 611 connects between the point P21 and the ground. On the other hand, the capacitor 612 is connected between a connection point P22 of the switching elements 470, 480 and the ground.

While the switching element 480 is on and the switching element 470 is off, the connection point P22 is connected to the point P21 via the switching element 480, and thus the capacitors 611, 612 are connected in parallel between the point P21 and the ground. That is, the capacitors 611, 612 connect between the point P21 and the ground as combined capacitance.

On the other hand, while the switching element 470 is on and the switching element 480 is off, the capacitor 612 is connected between the connection point P22 and the ground as a single element. That is, only the capacitor 611 with its capacitance connects between the point P22 and the ground. In this state, the capacitor 611 also functions as a bypass capacitor for the line of the reference voltage Vref.

By dividing the total capacitance in this manner, the capacitance of the capacitor 611 can be reduced, and with the additional capacitor 612 to the capacitor 611, the capacitance to be discharged by the current supplied by the constant current source 220 at the time of start-up can be increased compared with the case where the capacitor 611 is provided as a single element. Thereby, adjustment of the start-up time and flexibility in capacitance selection of the capacitor 611 are improved. For example, the start-up time can be increased without changing the capacitance of the capacitor 611 and/or the capacitance of the capacitor 611 can be reduced without changing the start-up time.

(7) Seventh Embodiment

Figure 10:
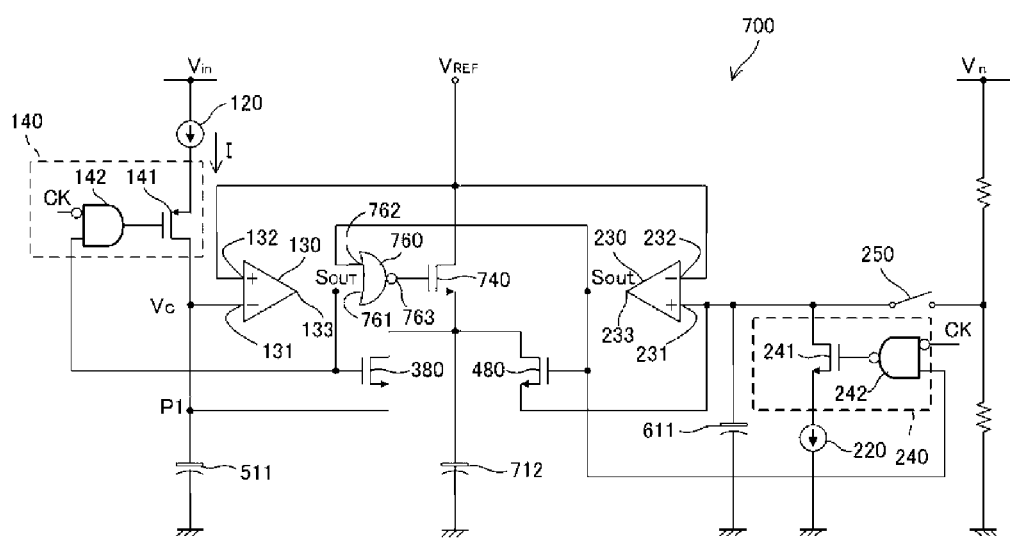
FIG. 10 is a diagram illustrating a configuration of a circuit according to a seventh embodiment.

FIG. 10 is a diagram illustrating a configuration of a circuit according to a seventh embodiment. A circuit 700 illustrated in FIG. 10 is schematically a circuit in which the circuit 500 as the first circuit illustrated in FIG. 8 and the circuit 600 as the second circuit illustrated in FIG. 9 are combined. In the circuit 700 illustrated in FIG. 10, the components in common with the circuit 500 and the circuit 600 are denoted by the same symbols and a detailed description will be omitted.

When the circuit 500 and the circuit 600 are combined, the switching element 370 and the switching element 470 are commonalized by a switching element 740, the switching elements each serving as an element that controls the supply of the reference voltage Vref to the output terminal in each circuit, the capacitor 512 and the capacitor 612 are commonalized by a capacitor 712, the capacitors each serving in part for the generation of soft start-up voltage, and a NOR circuit 760 is provided instead of the inverter 360 and the inverter 460.

That is, the output section 133 of the comparator 130 is connected to one input terminal 761 of the NOR circuit 760, and the output section 233 of the comparator 230 is connected to the other input terminal 762 of the NOR circuit 760. The output terminal 763 of the NOR circuit 760 is then connected to the control terminal (the gate terminal in FIG. 10) of the commonalizing switching element 740.

Therefore, only when both the output of the comparator 130 and the output of the comparator unit 230 are negative logic, the NOR circuit 760 outputs positive logic, and thus the switching element 740 is turned on. In other case, the NOR circuit 760 outputs negative logic, and thus the switching element 740 is turned off.

In this manner, one of divided halves of the capacitor is commonalized, and thereby two types of soft start-up circuits can be combined into a single circuit. Also, the capacitors and the switching elements are each commonalized and two inverters are replaced by a NOR circuit, and thus the circuit area can be reduced.

Figure 11:
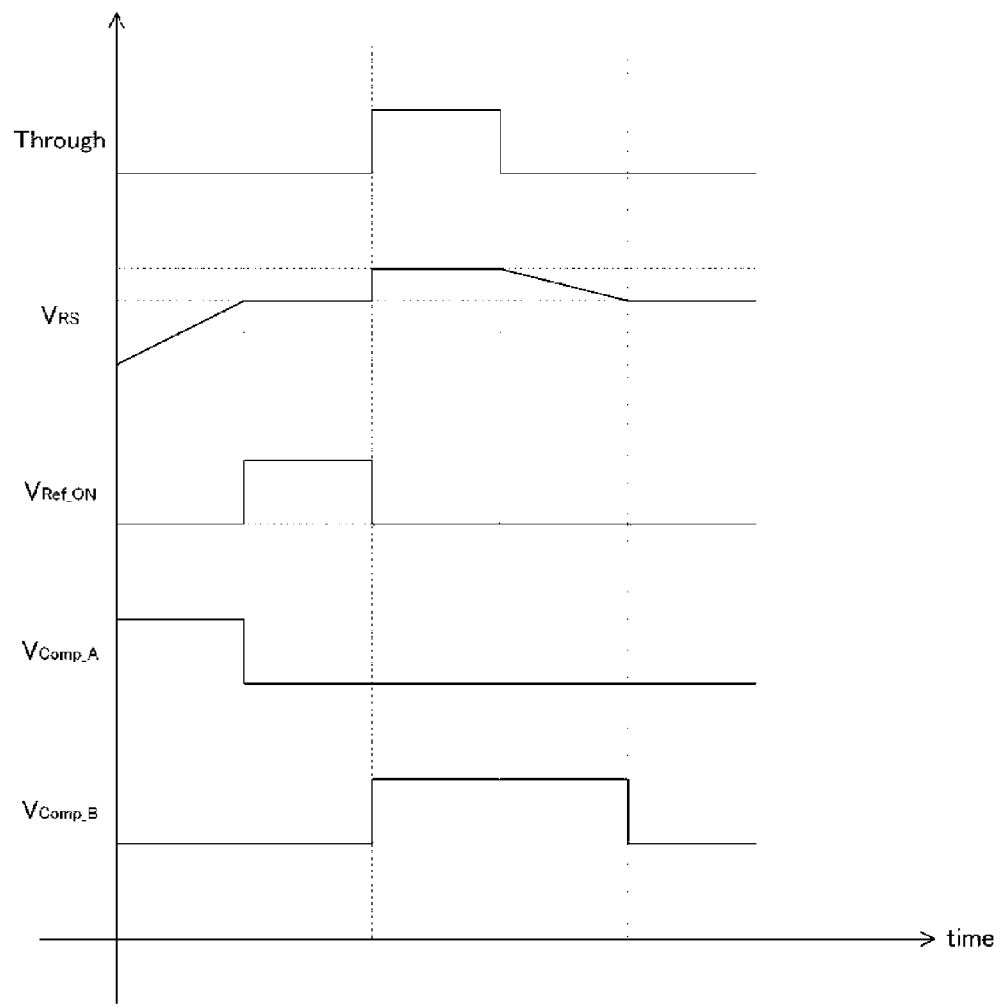
FIG. 11 is a timing chart for explaining an example operation of a circuit.

FIG. 11 is a timing chart for explaining an example operation of the circuit 700. In FIG. 11, Through is a control signal of the switch section 250, VRS is an output voltage OUT, Vref_on is a voltage inputted to the control terminal of the NOR circuit 760, Vcomp_A is an output signal of the comparator 130, and Vcomp_B is an output signal of the comparator 230.

As illustrated in FIG. 11, when the circuit operation of the circuit 700 is started and the circuit operation of the circuit 500 is started, the comparator 130 outputs positive logic. At this point, the NOR circuit 760 receives inputs of Vcomp_A of negative logic and Vcomp_B of positive logic at the respective input terminals, and thus the NOR circuit 760 outputs negative logic as Vref_on.

Thereby, the switching element 740 is turned off and the switching element 380 is turned on, and thus a voltage is gradually charged in the capacitor 511 and the capacitor 712 by the current which is supplied from the constant current source 120, and the voltage is outputted as the output voltage OUT. It should be noted that the switching element 480 is off at this point because the switch section 250 is turned off.

When the voltage charged in the capacitor 511 and the capacitor 712 exceeds the reference voltage Vref, Vcomp_A, which is the output of the comparator 130, is inverted to negative logic, and thus Vref_on outputted by the NOR circuit 760 is inverted to positive logic, then the switching element 740 is turned on and the switching element 380 is turned off. Consequently, the reference voltage Vref is outputted as the output voltage OUT.

Subsequently, when the switch section 250 is turned on and the circuit operation of the circuit 600 starts, Vcomp_B, which is the output of the comparator 230, is inverted to positive logic. At this point, the NOR circuit 760 receives inputs of Vcomp_A of negative logic and Vcomp_B of positive logic at the respective input terminals, and thus the NOR circuit 760 outputs negative logic as Vref_on.

Thereby, the switching element 740 is turned off and the switching element 480 is turned on, and thus the constant voltage Vin is outputted as the output voltage OUT via the switching element 480 and the switch section 250. It should be noted that the switching element 380 is off at this point.

Subsequently, when the switch section 250 is turned off, the stored voltage Vc charged in the capacitor 611 and the capacitor 712, that is, a voltage is gradually discharged by the current which is supplied from the constant current source 220, and the voltage is outputted as the output voltage OUT.

When the voltage charged in the capacitor 611 and the capacitor 712 falls below the reference voltage Vref, Vcomp_B, which is the output of the comparator 230, is inverted to negative logic. At this point, NOR circuit 760 receives inputs of Vcomp_A of negative logic and Vcomp_B of negative logic at the respective input terminals, and thus the NOR circuit 760 outputs positive logic as Vrefon. Consequently, the reference voltage Vref is outputted as the output voltage OUT.

In this manner, one soft start-up circuit for charging the capacitors 511, 712 and the other soft start-up circuit for discharging from the capacitors 611, 712 are combined and the circuit elements are partially commonalized, thereby achieving a reduced circuit area and a soft start-up circuit that is capable of gradually changing the output voltage over a certain time interval or longer in both cases where the voltage is increased and where the voltage is decreased.

(8) Eighth Embodiment

Figure 12:
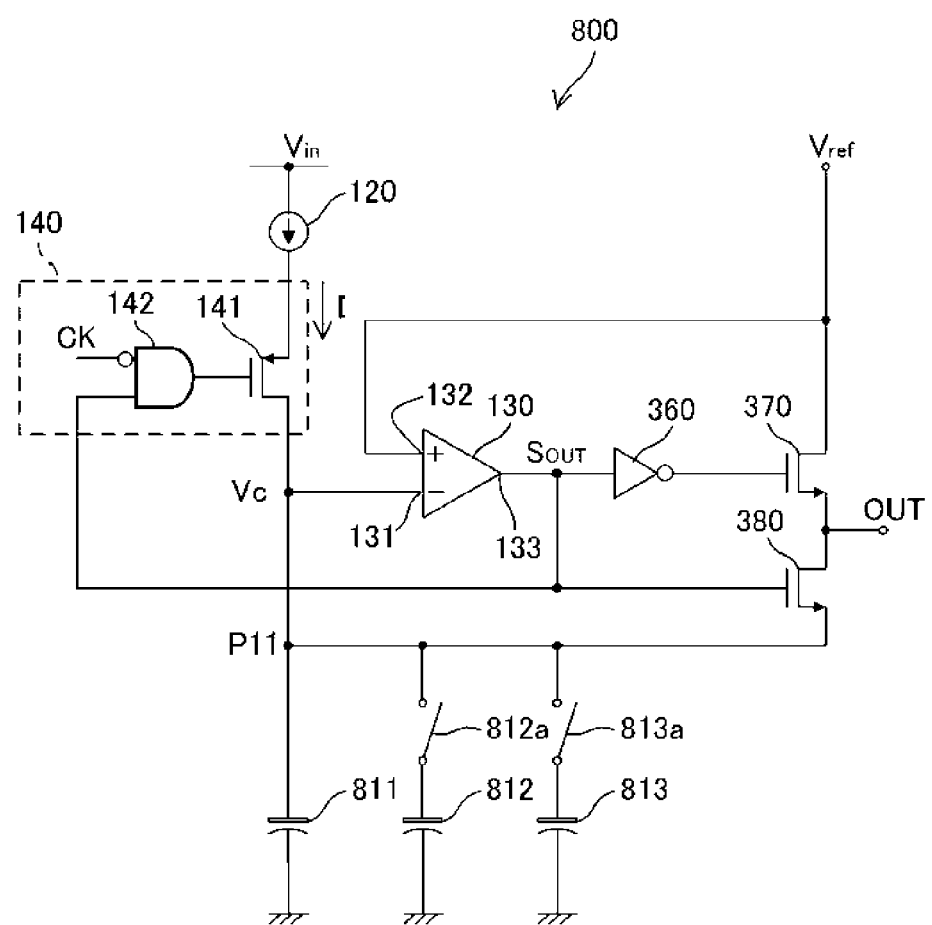
FIG. 12 is a diagram illustrating a configuration of a circuit according to an eighth embodiment.

FIG. 12 is a diagram illustrating a configuration of a circuit according to an eighth embodiment. The configuration of a circuit 800 illustrated in FIG. 12 partially includes the configuration of the circuit 300 according to the third embodiment, and thus the components in common with the circuit 300 are denoted by the same symbols and a detailed description will be omitted.

The circuit 800 illustrated in FIG. 12 includes the capacitor 110 having a variable capacitance of the circuit 300 according to the third embodiment, and specifically, has a configuration in which instead of the capacitor 110, a plurality of capacitors 811, 812, 813 is connected in parallel between the point P11 and the ground.

The capacitors 812, 813 are connected to the point P11 via switch circuits 812a, 813a. The on/off of each of the switch circuits 812a, 813a is controlled by a control signal inputted from a control unit (capacitance change unit) provided externally of the circuit 800.

That is, the time taken for the magnitude relationship between the stored voltage Vc and the reference voltage Vref to be reversed can be adjusted by controlling the switch circuits 812a, 813a and suitably adjusting the capacitances of the capacitors provided between the point P11 and the ground.

Although the circuit 300 according to the third embodiment has been taken as an example and described, the configuration for adjusting the capacitance may be applied to a type of circuit according to another embodiment, in which the capacitor is gradually charged or a type of circuit according to another embodiment, in which the charge stored in the capacitor is gradually discharged.

(9) Ninth Embodiment

Figure 13:
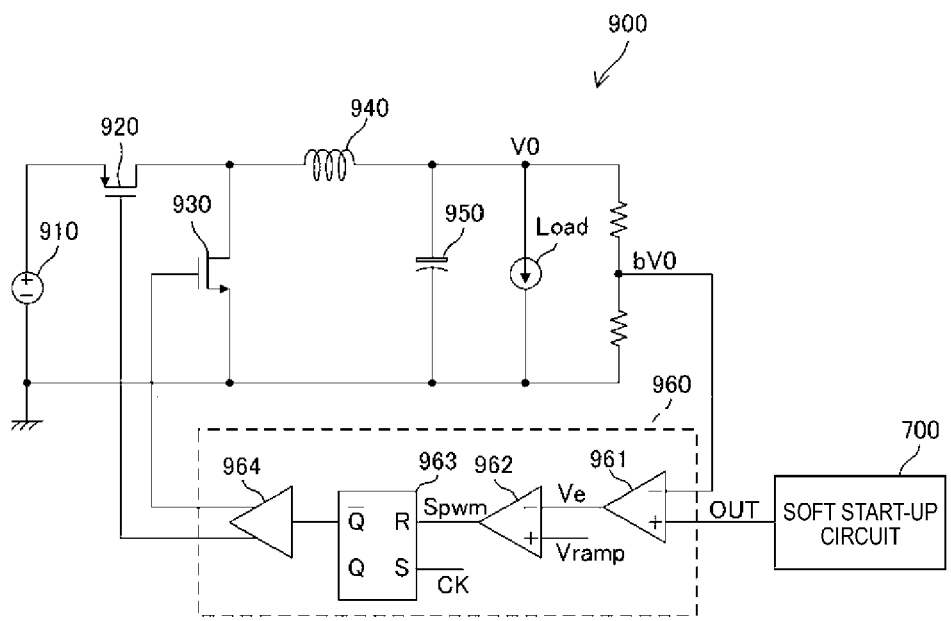
FIG. 13 is a diagram illustrating an example power supply circuit according to a ninth embodiment.

FIG. 13 is a diagram illustrating an example power supply circuit having a soft start-up function. FIG. 11 is a timing chart for explaining the operation of the power supply circuit illustrated in FIG. 13. It should be noted that in FIG. 13, the circuit 700 as a soft start-up circuit according to the seventh embodiment is taken as an example and illustrated. The components in common with the circuit 700 are denoted by the same symbols and a detailed description will be omitted.

The power supply circuit 900 illustrated in FIG. 13 is a step-down DC-DC converter in voltage control mode, and includes a DC power supply 910, switching elements 920, 930, an inductor 940, an output capacitor 950, a feedback control circuit 960, and the circuit 700 according to the seventh embodiment.

When the switching element 920 is on and the switching element 930 is off, a current flows through the inductor 940, is smoothed by the output capacitor 950, and flows through a Load. On the other hand, when the switching element 920 is off and the switching element 930 is on, the energy stored in the inductor 940 passes through the switching element 930, is smoothed by the output capacitor 950, and flows to the Load.

One end of the inductor 940 is connected to the positive electrode of the DC power supply 910 via the switching element 920 as well as to the ground via the switching element 930. The other end of the inductor 940 is connected to the Load as well as to the ground via the output capacitor 950, and thereby the voltage at the other end of the inductor 940 is smoothed by the output capacitor 950 and applied to the Load.

The switching element 920 is a PFET, and when the switching element 920 is switched from off to on, magnetic energy is stored in the inductor 940. The current is smoothed by the inductor 940 and the output capacitor 950.

The switching element 930 is an NFET, and when the switching element 930 is switched from off to on, magnetic energy stored in the inductor 940 flows through the Load as a current via the switching element 930 and is discharged. It should be noted that the switching element 930 may be configured with a commutation diode.

The switching elements 920, 930 receive inputs of PWM control signals at their control terminals from the driver circuit 964 described later, the PWM control signals having on/off states inverted to each other. When the switching element 920 is on, the switching element 930 is off, and when the switching element 920 is off, the switching element 930 is on. In this manner, constant voltage control can be performed according to a duty ratio of the PWM control signals.

The feedback control circuit 960 includes an error amplifier 961, a comparator 962, an RS flip-flop 963, and a driver circuit 964, and is configured to control on/off of the switching elements 920, 930 so that an output voltage V0 converges to a target voltage.

The error amplifier 961 detects an error between the output voltage and the target voltage, and outputs an error voltage Ve. Specifically, the error amplifier 961 receives inputs of a voltage bV0 and an output voltage OUT of the circuit 700 and outputs a voltage as the error voltage Ve according to the difference between the voltage bV0 and the output voltage OUT, the voltage bV0 being obtained by dividing the output of the power supply circuit 900 into a predetermined ratio, the output voltage OUT indicating a target voltage of the voltage Vb0.

The comparator 962 generates a switching signal to be outputted to the driver circuit 964. Specifically, the comparator 962 receives inputs of the error voltage Ve and a ramp wave Vramp which is a saw-tooth triangular wave inputted from a triangular wave generation circuit, and outputs a signal of positive logic (high level) when the error voltage Ve is higher than the lamp signal Vramp, or outputs a signal of negative logic (low level) when the error voltage Ve is lower than or equal to the ramp signal Vramp. That is, a PWM signal Spwm having a frequency according to the period of the ramp wave Vramp is outputted.

The RS flip-flop 963 receives inputs of the PWM signal Spwm and a clock signal CK at reset terminal R and set terminal S, respectively, and outputs the PWM signal Spwm to the driver circuit 964 only when the clock signal CK is being inputted.

When the PWM signal Spwm is positive logic (high level), the driver circuit 964 turns on the switching element 920 and turns off the switching element 930, whereas when the PWM signal Spwm is negative logic (low level), the driver circuit 964 turns off the switching element 920 and turns on the switching element 930.

Thus, the on/off ratio of the switching element 920 and the switching element 930 is controlled as follows: when the output voltage V0 is lower than the target voltage, the on-proportion of the switching element 920 and the off-proportion of the switching element 930 are increased, whereas when the output voltage V0 is higher than the target voltage, the off-proportion of the switching element 920 and the on-proportion of the switching element 930 are increased. As a consequence, on/off of the switching elements 920, 930 is controlled so that the output voltage V0 converges to the target voltage.

The error amplifier 961 receives an input of the output voltage OUT from the circuit 700 according to the seventh embodiment. Therefore, when the power supply circuit 900 is activated, the output voltage OUT is gradually increased from 0V and reaches the reference voltage Vref which is a predetermined target voltage after an elapse of a predetermined soft start time.

Even when the capacitances of the capacitors 511, 712 are reduced, with suitably adjustment of the on/off ratio of the switch section 140, the soft start time when the voltage is increased can be increased compared with the case where the switch section 140 is not turned on or off. Consequently, the output voltage of the power supply circuit 900 is gradually increased until the soft start time elapses, and thus a rush current of the power supply circuit 900 can be prevented.

On the other hand, after the switch section 250 of the circuit 700 is turned on, then turned off, the output voltage OUT is gradually decreased from a voltage higher than the reference voltage Vref, and reaches the reference voltage Vref which is the predetermined target voltage after an elapse of a predetermined soft start time.

Even when the capacitances of the capacitors 611, 712 are reduced, with suitably adjustment of the on/off ratio of the switch section 240, the soft start time when the voltage is decreased can be increased compared with the case where the switch section 240 is not turned on or off. Consequently, the output voltage of the power supply circuit 900 is gradually decreased until the soft start time elapses, and thus an over current of the power supply circuit 900 can be prevented.

(10) Tenth Embodiment

Figure 14:
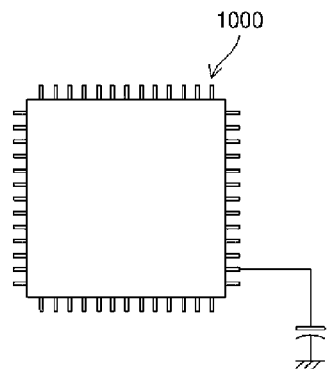
FIG. 14 is a diagram for explaining a power supply IC according to a tenth embodiment.
Figure 15:
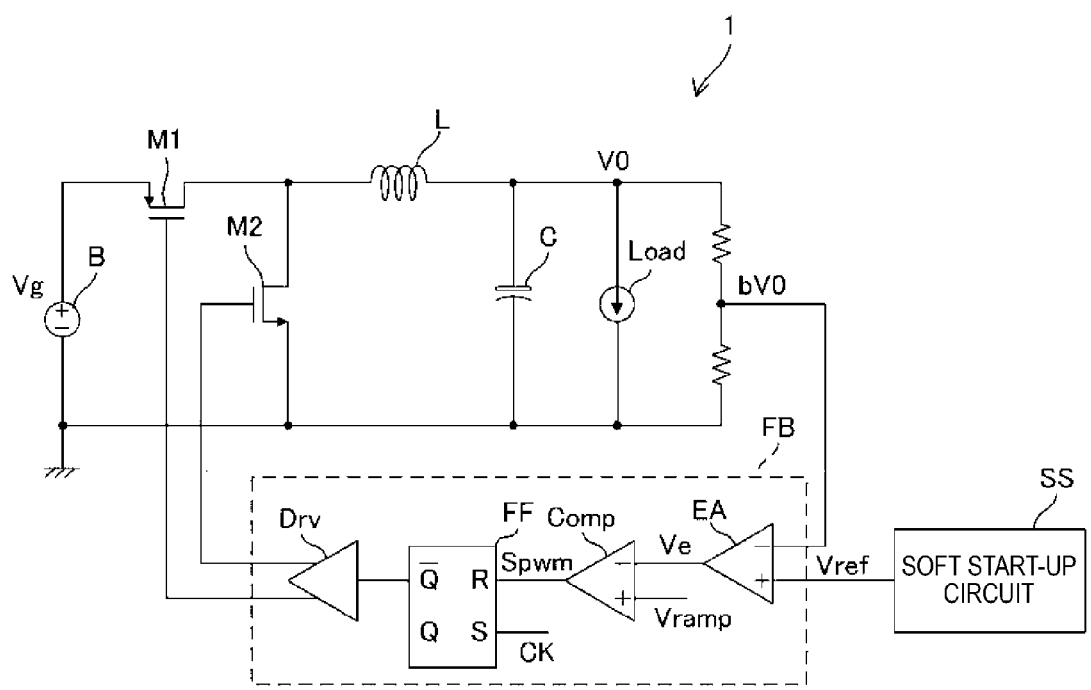
FIG. 15 is a diagram illustrating an example power supply circuit including a soft start-up circuit according to the related art.

FIG. 14 is a diagram for explaining a power supply IC according to a tenth embodiment. The power supply IC1000 illustrated in FIG. 14 is such that approximately the entire circuit in one of the above-described first to ninth embodiments is formed in the IC and at least part of the capacitors that determine timing is achieved by connecting an external capacitor disposed outside the IC.

For example, in the case where a circuit that determines timing is achieved by one capacitor 110 as in the first embodiment, the one capacitor 110 is achieved by attaching an external capacitor. For example, in the case where a circuit that determines timing is achieved by two divided capacitors 511, 512 as in the fifth embodiment, at least one of the capacitors is achieved by attaching an external capacitor.

Consequently, even when it is difficult to form capacitors in the IC, part of the capacitors can be achieved by an external capacitor to decrease the capacitance of the capacitors, thereby reducing the chip area.

(11) Conclusion

According to the embodiments described above, the circuits 100 to 900 are achieved that each includes a capacitor; a current source to supply a current to the capacitor; a comparator to output a result of comparison made between a voltage stored in the capacitor and a predetermined voltage; and a switch section to intermittently allow flowing and blocking of a current which is caused to flow to the capacitor by the current source. With the circuits 100 to 900, the rate of charging to the capacitor and/or the rate of discharging from the capacitor can be delayed by the intermittent flowing and blocking performed by the switch section. The time taken for the voltage of the capacitor to reach a target voltage can be adjusted without adjusting the capacitance of the capacitor or the value of the current of the constant current source.

It should be noted that the present technology is not limited to the embodiments described above, and includes any configuration which is obtained by replacing part of or changing a combination of the configurations disclosed in the above-described embodiments, as well as any configuration which is obtained by replacing part of or changing a combination of publicly known arts and the disclosed configurations. The technical scope of the present technology is not limited to the embodiments described above, but extends to the subject matter described in the appended claims and equivalents thereof.

Additionally, the present technology may also be configured as below.

(A)
A circuit including:
 a capacitor;
 a current source configured to supply a current to the capacitor;
 a comparator configured to output a result of comparison between a voltage stored in the capacitor and a predetermined voltage; and
 a switch section configured to intermittently which is caused to flow to the capacitor by the current source.

(B)
The circuit according to (A), further including:
 an output section configured to output a voltage,
 wherein when, as a result of a gradual change in the stored voltage from an initial value along with the intermittent flowing and blocking performed by the switch section, a magnitude relationship between the stored voltage and the predetermined voltage is reversed, the comparator inverts an output between positive logic and negative logic, and
 wherein before the output of the comparator is inverted, the output section outputs the stored voltage of the capacitor, and after the output of the comparator is inverted, the output section outputs the predetermined voltage.

(C)
The circuit described in (B) in which the output section includes a first switching element, a second switching element, and an inverter, the first switching element and the second switching element being connected in series between a line of the predetermined voltage and a positive terminal of the capacitor, and the output section is configured to output a voltage at a connection point between the first switching element and the second switching element,
 wherein a control terminal of the first switching element is connected to an output terminal of the comparator via the inverter,
 wherein a control terminal of the second switching element is directly connected to the output terminal of the comparator,
 wherein the second switching element is turned on by an output of the comparator before the output inversion to supply the stored voltage of the capacitor to the connection point, and is turned off by an output of the comparator after the output inversion, and
 wherein the first switching element is turned on by an output of the comparator after the output inversion to supply the predetermined voltage to the connection point, and is turned off by an output of the comparator before the output inversion.

(D)
The circuit according to (C),
 wherein the capacitor includes a first capacitor disposed on a line which connects the current source to a ground, and a second capacitor disposed on a line which connects the connection point to a ground.

(E)
The circuit according to any one of (A) to (D), further including:
 a first circuit and a second circuit each including the capacitor, the current source, the comparator, the switch section, and the output section,
 wherein in the first circuit, the stored voltage is gradually increased from an initial value along with the intermittent flowing and blocking performed by the switch section,
 wherein in the second circuit, the stored voltage is gradually decreased from an initial value along with the intermittent flowing and blocking performed by the switch section, and
 wherein the second capacitor included in the first circuit and a second capacitor included in the second circuit are shared.

(F)
The circuit according to any one of (A) to (E), further including:
 a capacitance change unit configured to change a capacitance of the capacitor.

(G)
The circuit according to any one of (A) to (F), further including:
 an adjustment unit configured to adjust a ratio of the flowing and blocking performed by the switch section.

(H)
A power supply circuit including:
 the circuit according to any one of (B) to (D); and
 a feedback circuit configured to control an output voltage by use of a voltage outputted by the output section as a target voltage.

What is claimed is:
1. A circuit comprising:
 a capacitor;
 a current source configured to supply a current to the capacitor;
 a comparator configured to output a result of comparison between a stored voltage in the capacitor and a predetermined voltage;
 switch circuitry configured to intermittently flow and block the current to the capacitor supplied by the current source; and
 output circuitry configured to output a voltage,
 wherein when, as a result of a gradual change in the stored voltage from an initial value along with the intermittent flowing and blocking performed by the switch circuitry, a magnitude relationship between the stored voltage and the predetermined voltage is reversed, the comparator inverts an output between positive logic and negative logic, and
 wherein before the output of the comparator is inverted, the output circuitry outputs the stored voltage of the capacitor, and after the output of the comparator is inverted, the output circuitry outputs the predetermined voltage.
2. The circuit according to claim 1,
 wherein the output circuitry includes a first switching element, a second switching element, and an inverter,
 wherein the first switching element and the second switching element are connected in series between a line of the predetermined voltage and a positive terminal of the capacitor,
 wherein the output circuitry is configured to output a voltage at a connection point between the first switching element and the second switching element,
 wherein a control terminal of the first switching element is connected to an output terminal of the comparator via the inverter,
 wherein a control terminal of the second switching element is directly connected to the output terminal of the comparator, wherein the second switching element is turned on by an output of the comparator before the output inversion to supply the stored voltage of the capacitor to the connection point, and is turned off by an output of the comparator after the output inversion, and wherein the first switching element is turned on by an output of the comparator after the output inversion to supply the predetermined voltage to the connection point, and is turned off by an output of the comparator before the output inversion.

3. The circuit according to claim 2, wherein the capacitor includes a first capacitor disposed on a line which connects the current source to a ground, and a second capacitor disposed on a line which connects the connection point to a ground.

4. A circuit comprising:

a capacitor;

a current source configured to supply a current to the capacitor;

a comparator configured to output a result of comparison between a stored voltage in the capacitor and a predetermined voltage;

switch circuitry configured to intermittently flow and block the current to the capacitor supplied by the current source; and a first circuit and a second circuit each including the capacitor, the current source, the comparator, the switch circuitry, and an output circuitry, wherein in the first circuit, the stored voltage is gradually increased from an initial value along with the intermittent flowing and blocking performed by the switch circuitry, wherein in the second circuit, the stored voltage is gradually decreased from an initial value along with the intermittent flowing and blocking performed by the switch circuitry, and wherein the second capacitor included in the first circuit and a second capacitor included in the second circuit are shared.

5. The circuit according to claim 1, further comprising:

capacitance change circuitry configured to change a capacitance of the capacitor.

6. The circuit according to claim 1, further comprising:

adjustment circuitry configured to adjust a ratio of the flowing and blocking performed by the switch circuitry.

7. A power supply circuit comprising:

the circuit according to claim 1; and a feedback control circuit configured to control an output voltage by use of a voltage outputted by the output circuitry as a target voltage.

8. The power supply circuit according to claim 7, wherein the output circuitry includes a first switching element, a second switching element, and an inverter, wherein the first switching element and the second switching element are connected in series between a line of the predetermined voltage and a positive terminal of the capacitor, wherein the output circuitry is configured to output a voltage at a connection point between the first switching element and the second switching element, wherein a control terminal of the first switching element is connected to an output terminal of the comparator via the inverter, wherein a control terminal of the second switching element is directly connected to the output terminal of the comparator, wherein the second switching element is turned on by an output of the comparator before the output inversion to supply the stored voltage of the capacitor to the connection point, and is turned off by an output of the comparator after the output inversion, and wherein the first switching element is turned on by an output of the comparator after the output inversion to supply the predetermined voltage to the connection point, and is turned off by an output of the comparator before the output inversion.

9. The power supply circuit according to claim 8, wherein the capacitor includes a first capacitor disposed on a line which connects the current source to a ground, and a second capacitor disposed on a line which connects the connection point to a ground.

10. The power supply circuit according to claim 7, further comprising:

capacitance change circuitry configured to change a capacitance of the capacitor.

11. The power supply circuit according to claim 7, further comprising:

adjustment circuitry configured to adjust a ratio of the flowing and blocking performed by the switch circuitry.

* * * * *